United States Patent

[11] 3,578,156

[72] Inventor Carl J. Norby
Boulder, Colo.
[21] Appl. No. 869,438
[22] Filed Sept. 29, 1969
[45] Patented May 11, 1971
[73] Assignee International Business Machines Corporation
Armonk, N.Y.
Continuation of application Ser. No. 692,337, Dec. 21, 1967, now abandoned.

[54] CONTAINER FOR A REEL
8 Claims, 4 Drawing Figs.

[52] U.S. Cl. .......... 206/52F, 220/55C, 285/322
[51] Int. Cl. .......... B65d 85/67
[50] Field of Search .......... 206/52, 52 (F), 59 (E); 220/55 (C); 285/322

[56] References Cited

UNITED STATES PATENTS

| | | | |
|---|---|---|---|
| 2,727,759 | 12/1955 | Elliott | 285/322 |
| 3,004,658 | 10/1961 | Rehklau | 206/52(F) |
| 3,307,688 | 3/1967 | Widmont, Jr. | 206/52(F) |
| 3,489,273 | 1/1970 | McKelvey, Jr. | 206/52(F) |

*Primary Examiner*—William T. Dixson, Jr.
*Attorneys*—Hanifin and Jancin and Donald W. Margolis

ABSTRACT: A container having a base member, a cover member and a locking mechanism for releasably locking the members together. A locking mechanism having a keeper, latching fingers for releasably engaging the keeper, and a pushbutton to release the fingers from the keeper.

Patented May 11, 1971 3,578,156

INVENTOR
CARL J. NORBY
BY Donald W. Margolis
ATTORNEY

CONTAINER FOR A REEL

This application is a continuation of application Ser. No. 692,337 filed on Dec. 21, 1967, now abandoned.

BACKGROUND OF THE INVENTION

1. Field of the Invention

This invention relates to a container for reels, spools, bobbins and the like which container provides a sealed enclosure with an improved locking mechanism. More particularly, this invention is directed to a new and useful container for reels of magnetic tape.

2. Description of the Prior Art

Electronic data processing utilizes large volumes of magnetic recording media to retain and transport bits of information. Such recording media is often found in the form of magnetic tape. In use, magnetic tape is most commonly wound on reels and brought into interaction with one or more transducers by tape transport devices which move the tape from reel to reel. When not in use, it is necessary for magnetic tape wound on a reel to be stored in an environment which provides protection from contamination and shock while still maintaining it in a readily accessible condition. This has led to the development of tape reel containers comprising, generally, a cover member and a base member, constructed to form an enclosure when brought together. The cover member normally includes a central depression or well which serves as a support and stabilizer for a reel disposed within the container. The depressed portion also normally serves as a housing for a carrying handle and a locking mechanism. The locking mechanism serves to releasably join the base and cover members together. A locking mechanism in the container is desirable to avoid having the container accidentally open, thus, exposing the wound reel of tape to possible contamination from external dirt, unwinding of the tape from the reel with concomitant damage to the recording media or shocks and stresses to the media with resultant loss of data.

In the past, the most common type of locking mechanism for a reel container required rotation of the handle portion within the central depression of the cover of the container, which in turn caused a resilient grommet to expand and frictionally engage a socket in the base member. A locking mechanism of this type has the disadvantages of requiring two-hand operation, one hand to hold the container and one hand to rotate the handle, generation of debris due to frictional engagement between the soft grommet and the socket, and potential failure of the grommet due to mechanical or chemical deterioration. Containers with locking mechanisms of this type have an additional shortcoming in that it is difficult to determine whether they are in a locked or unlocked mode. Furthermore, a specific manual action must be taken to both lock and unlock a container having this type of mechanism after the cover member and base member have been brought together.

Recent developments in container locking mechanism have led to arrangements in which a bistable push-pull action is substituted for a clockwise-counterclockwise rotational action to lock and unlock the cover member and base member. In the push-pull type of container mechanism latching between the cover member and base member is obtained by physically ringing expandable members, such as latching fingers or a resilient ring, into locking contact with a retaining shoulder. This type of locking mechanism also has its shortcomings. It still requires two-handed operation for unlocking, one hand to steady the container and the other hand to lift the push-pull actuator. Furthermore, it may be difficult to maintain this type of mechanism in locking relationship in the absence of means to positively prevent the locking mechanism from assuming an unlocked position due to external stresses.

A third type of container mechanism requires frictional engagement between a rubber covered stud and a metal plate to provide locking action. This type of mechanism is automatically locked by bringing the cover member into proper registration with the base member and is capable of one-handed unlocking by depression of a pushbutton in the handle. However, it has the shortcoming of a short useful life due to the nature of the frictional and biting contact between the rubber and metal locking portions. This results in the rapid destruction and deterioration of the rubber surface with the accompanying failure of the locking mechanism.

Therefore, one important object of this invention is to provide a reel container having a lock which provides completely one-handed operation during all steps of handling, including locking, unlocking, and carrying of the container.

Another important object of this invention is to provide a lock for a reel case which provides positive locking action between the cover member and the base member so that they may not be accidentally separated.

Other important objects of this invention are to provide a locking mechanism which readily indicates whether the container is in a locked or unlocked mode, to provide a locking mechanism which automatically causes locking to occur when the cover member and base member are brought into close engagement, and to provide a locking mechanism which avoids wear and the generation of debris within the container.

SUMMARY OF THE INVENTION

To accomplish these and other objects the container of the present invention comprehends a cover member, including a substantially cylindrical well extending downwardly from the center of the cover, around which the hub of a reel may be located, and a base member. A handle extending across the cover well serves to house pushbutton actuating means and to support flexible latching fingers. The base member includes a keeper arrangement. The keeper includes a flange which may be securely grasped by the latching fingers, and which is positioned in receiving relationship to the cover portion of the locking mechanism. The latching fingers and keeper are constructed to cam into locking relationship upon being brought into close contact. A retaining member, positioned to hold the latching fingers in positive locking relationship with the keeper, is also included in the locking mechanism. Movement of the retaining member and disengagement of the latching fingers from the keeper may be accomplished only by depression of the pushbutton, which is a one-handed operation.

BRIEF DESCRIPTION OF THE DRAWING

The foregoing and other objects, features and advantages of the invention will be apparent from the following more particular description of the preferred embodiment of the invention, as illustrated in the accompanying drawing, in which.

DESCRIPTION OF THE PREFERRED EMBODIMENT

Figures 1, 2, 3, 4:
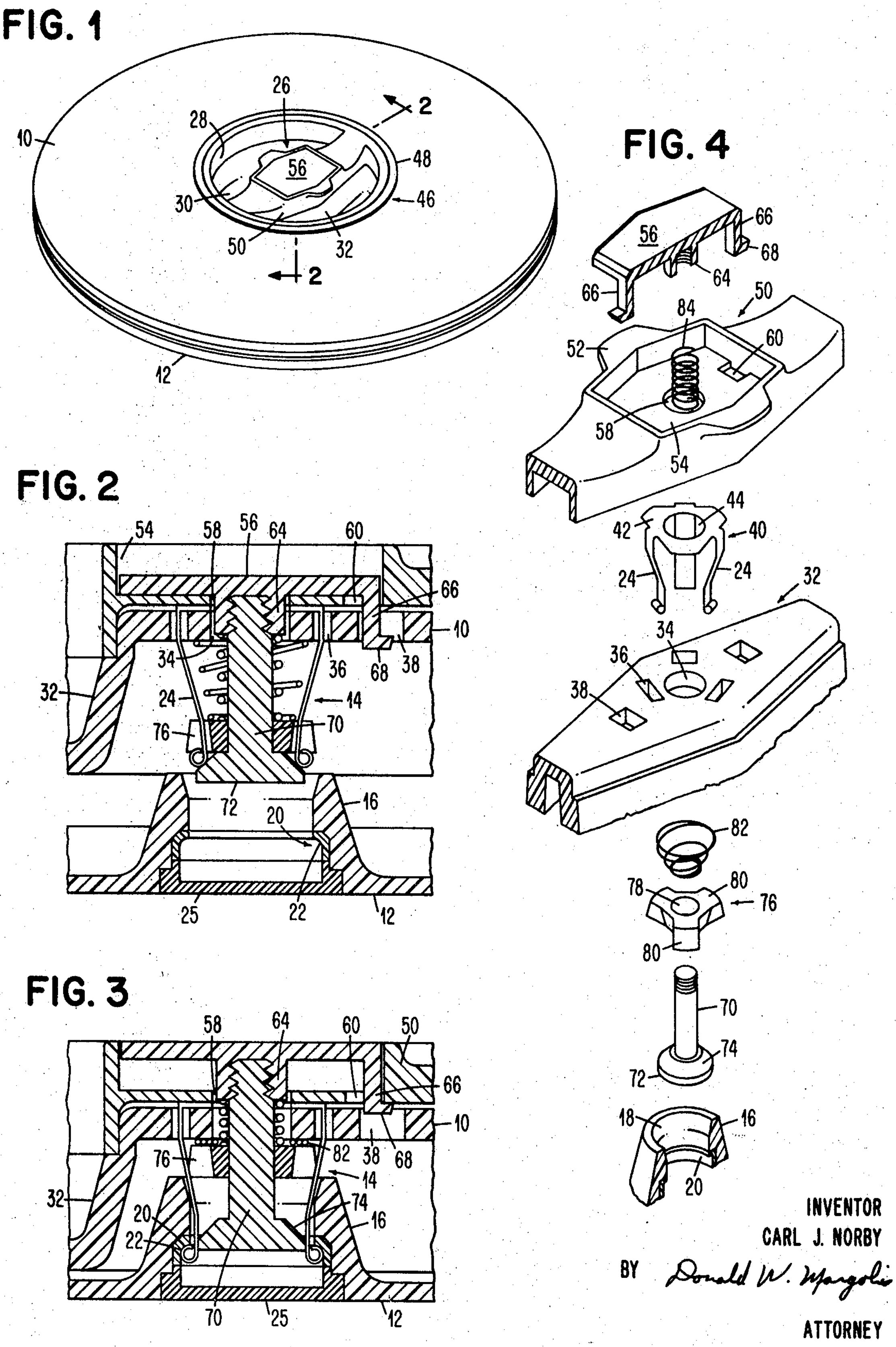
FIG. 1 is a perspective view of a container constructed in accordance with this invention.
FIG. 2 is an enlarged fragmentary cross-sectional view illustrating the cover member and the base member separated from one another with the locking mechanism of the cover member in position to be received by the bottom and taken along line 2—2 of FIG. 1.
FIG. 3 is an enlarged fragmentary cross-sectional view similar to FIG. 2, but showing the cover member and base member together and the mechanism in a locked condition.
FIG. 4 is an exploded perspective view of the locking mechanism shown in FIGS. 2 and 3.

The container shown in the drawing includes a cover member 10 and a base member 12 which are releasably secured in locking relationship by locking mechanism 14. The cover and base members each have conventional sidewalls provided with suitable peripheral flanged end walls, in this instance, to form an enclosure for a reel of magnetic tape. The end walls of the cover member and base member are preferably constructed to telescope within one another, with the end wall of at least one member capable of making firm closing contact with a gasket, not shown, circumscribing the periphery of the other member, within or without the flanged end wall. An arrangement of this type serves to protect an enclosed tape and tape reel from external contact and contamination.

In accordance with the embodiment of this invention as seen in FIGS. 2 and 3 the base 12 is provided with an upwardly extending socket 16 generally in the shape of a truncated cone. At the uppermost portion of the internal wall of socket 16 there is included an inwardly cammed annular face 18 below which there is an annular flange or keeper 20. Keeper 20 includes ring insert 22 having an L-shaped cross section and provided to impart improved wear characteristics to the keeper. Cammed surface 18 is adopted to guide flexible latching fingers 24 into locking position, while keeper 20 is adapted to be engaged by latching fingers 24 in locking relationship. Plug 25 is secured within the bottom of socket 16 to render the bottom of base member 12 closed.

Cover member 10 is provided with a well 26 at its center. The diameter of well 26 is such that its inner surface fits within the hub of a reel stored in the enclosure defined by cover member 10 and base member 12. Well 26 includes a cylindrical sidewall 28 and a bottom wall 30 which together define a seat for handle support crossbar 32. As shown in fragmentary isometric section in FIG. 4, on the top of crossbar 32, there are included central circular hole 34, three slots 36 spaced radially around central hole 34 and two clearance holes 38 on opposite sides of central hole 34. Spring latch 40 consisting of a top support plate 42 including opening 44 and three latching fingers 24. Spring latch 40 is borne by crossbar 32 in such a manner that latching fingers 24 extend through slots 36 with hole 44 in registration with central hole 34 of the crossbar. Retaining member 46 comprised of support ring 48 and handle 50 is supported by crossbar 32 and the top portion of cover 10 immediately surrounding well 26. As shown in isometric section in FIG. 4, handle 50 includes tabs 52 to facilitate one-handed lifting of the container. Seat 54 in handle 50 is designed to receive pushbutton 56 and includes central circular hole 58 and two button connection holes 60 on opposite sides of central hole 58. Retaining member 46, including handle 50, is constructed and positioned in such a manner that central circular hole 58 is in registration with spring latch hole 44 and central hole 34 of crossbar 32.

As is best shown in FIG. 4, in which it is shown in section, button 56 includes a central threaded boss 64 an two L-shaped connecting pins 66. Button 56 is secured within seat 54 of handle 50 by the action of pins 66 passing through button connection holes 60 to form a dimensionally secure connection which allows limited vertical motion. Separation of button 56 from the handle is avoided by the action of foot portion 68 of pin 66 against the bottom of handle 50. When pushbutton 56 is depressed, pins 66 pass through clearance holes 38 in crossbar 32. Similarly, boss 64 passes through registered holes 58, 44 and 34 in handle 50, spring latch 40 and crossbar 32, respectively.

Threaded pin 70, including collar portion 72 having cammed surface 74 is screwed into connection with threaded boss 64 through holes 34, 44 and 58. Spring actuating member 76, including central hole 78 is slidably mounted on the shank of pin 70. Projecting portions 80 of spring actuating member 76 are adopted to extend between the latching fingers and are of sufficient radial length to be supported by the uppermost portion of socket 16 when cover member 10 and base member 12 are brought together. Conical spring 82 and spiral spring 84 are also slidably mounted around the shank portion of pin 70. Conical spring 82 is of such length that its broad base rests under compression against the bottom of crossbar 32 while its narrow end rests against actuator 76. Spiral spring 84 is of such diameter with relation to holes 34, 44 and 58 that it can ride through said holes and make physical contact with the underside of pushbutton 56. Spiral spring 84 extends between spring actuator 76 and pushbutton 56, but is not under compression when the container is open as in FIG. 2.

It will be appreciated that when cover member 10 is separated from base member 12, as shown in FIG. 2, the pressure exerted by conical spring 82 against the bottom of crossbar 32 and the top of spring actuator 76 is such that spring actuator 76 is urged away from crossbar 32. The resultant pressure is transmitted from spring actuator 76 to collar 72 of threaded pin 70 which are in turn urged away from crossbar 32. As pin 70 is in screwed connection with button 56, button 56 is pulled in the same direction as pin 70, thus, causing it to be pulled to the bottom of seat 54. Due to this relationship when cover member 10 is separated from the base member 12, the portion of the locking mechanism in cover member 10 assumes a stable position in which button 56 is visibly depressed within seat 54 of handle 50.

From the foregoing description, it can be seen that when cover member 10 is placed on base member 12, in mating relationship, spring actuator 76 becomes supported by the uppermost portion of socket 16. Thereafter, any force exerted to cause cover member 10 to come into closing relationship with base member 12 will cause compression of both conical spring 82 and spiral spring 84 by spring actuators 76. The relative elasticity of conical spring 82 and spiral spring 84 is such that conical spring 82 is more easily compressed. Thus, when cover member 10 and base member 12 are brought together spiral spring 84 and conical spring 82 are both compressed. However, spiral spring 84 exerts greater pressure than conical spring 82 and urges pushbutton 56 and connected pin 70 and collar 72 upwardly. Simultaneously, latching fingers 24 are placed in contact with the cammed annular surface 18 of socket 16. Application of force causing cover member 10 to move toward base member 12 causes the ends of latching fingers 24 to cam downwardly along surface 18 and below keeper 20. With the outwardly extending portion of latching fingers 24 relieved of the lateral constraint imposed by surface 18, they are free to cam outwardly along portion 74 of collar 72. This freedom of action combined with pressure from spring 84 on button 56 causes button 56 and connected pin 70 and collar 72 to be urged upwardly and latch fingers 24 to move outwardly along cam surface 74. As latch fingers 24 move under keeper 20, collar 72 is free to move upwardly a final increment, thus pinioning latching fingers 24 between collar 72 and keeper 20 in such a manner that the lower portion of the fingers cannot move away from the keeper 22. A positive locking relationship between latching fingers 24 and keeper 20 is thus obtained.

No downward force can be exerted on collar 72 to release latching fingers 24 from the locking relationship with keeper 20, except by the action of pushbutton 56.

To disengage cover member 10 from base member 12 it is merely necessary to depress button 56 in a one-handed operation. Depression of button 56 causes collar 72 to ride below the bottom of latching fingers 24. This allows latching fingers 24, which are normally inwardly biased, to ride up cam surface 74 so that the fingers are no longer in locking relationship with keeper 20. When this position has been achieved, cover member 10 may be removed from base member 12.

Once cover member 10 has been removed from locking engagement with cover member 12 spring actuator 76 no longer exerts upward force on button 56. This allows conical spring 82 to once more exert pressure upon actuator 76, collar 72, pin 70 and button 56, thus, retaining button 56 in a visibly depressed state within handle 50. To a lessor degree, normally inwardly biased latching fingers 24 exert a downward pressure upon collar 72 and pin 70 and button 56. Due to these forces, the container can always be ascertained to be in an unlocked mode if pushbutton 56 is visibly depressed, and conversely, in a locked mode if pushbutton 56 is not depressed.

From the foregoing description it will be appreciated that the many objects of this invention are achieved with the mechanism shown. Due to the construction of the locking mechanism, locking is automatically achieved by compressing the cover member and the base member with one hand. The container may be opened with one hand by exerting pressure on pushbutton 56 and the container may be carried with one hand by the handle. When locked, accidental opening of the container is impossible due to the positive locking action of fingers 24 with keeper 20 which collar 72 provides. Due to the biasing action of conical springs 82 and latching fingers 24 pushbutton 56 is always in a visibly depressed state if the container is unlocked. Similarly, pushbutton 56 can achieve a raised condition only when the container is locked. Therefore, the condition of the container is always readily ascertainable, by either sight or use of the tactile senses. As has been described, locking of the container takes place automatically when the cover member and base member are urged together.

Choice of materials for the locking mechanism and container may be such as to avoid wear and the generation of debris within the container. It may be readily appreciated that the various parts of the locking mechanism may be constructed of wear resistant metals or plastics which do not deteriorate or generate particles upon contact. The choice of such materials is within the skill of the art.

It must also be understood that the preferred embodiment set forth, hereinabove, may be easily modified while leaving the resulting mechanism within the scope of the subject invention. For example, reversal of the parts of the locking mechanism from the cover member to the base member may be readily achieved and still be within the scope of this invention. Similarly, reversal of the latching fingers and keeper may be easily obtained, thus causing the fingers to latch inwardly upon a central keeper.

While the invention has been particularly shown and described with reference to a preferred embodiment thereof, it will be understood by those skilled in the art that the foregoing and other changes in form and detail may be made therein without departing from the spirit and scope of the invention.

I claim:

1. In a container for storing a reel, said container including in combination a cover member, a base member, and locking means of the keeper and finger type for releasably locking said members together to form a reel receiving enclosure, the improvement wherein the locking means comprises:

a keeper having a locking shoulder secured to one of said members;

a plurality of latching fingers secured to the other of said members;

means for bringing said fingers into locking engagement with said locking shoulder in response to closure of said cover with said base member;

pushbutton means carried by the cover member;

retaining means including a blocking collar secured to said pushbutton means, said retaining means being movable with said pushbutton between a first position for blocking with the collar the release of said fingers from said locking shoulder and a second position wherein the collar is moved out of blocking relationship with said fingers, thereby allowing disengagement of said fingers with said locking shoulder whereby to release said cover from said base member; and resilient means for yieldably moving said retaining means into said first position in response to closure of said cover member and base member for blocking the release of said latching fingers from said locking shoulder.

2. A container, as defined in claim 1, wherein means for disengaging said latching fingers from said locking shoulder are included, said disengaging means being operative to disengage said latching fingers from said locking shoulder in response to the movement of said retaining means to its second named position.

3. A container, as defined in claim 2, wherein said means for yieldably bringing said retaining means to said first named position includes a spring.

4. A container, as defined in claim 3, wherein said latching fingers have an outwardly extending portion and wherein said keeper shoulder is an annular flange.

5. In a container for storing a reel, said container including in combination a cover member, a base member, and locking means of the keeper and finger type for releasably locking said members together to form a reel receiving enclosure, the improvement wherein the locking means comprises:

a keeper in the form of a flange secured to one of said members;

a plurality of flexible latching fingers secured to the other of said members, said fingers positioned to be placed in juxtaposition to the said keeper flange upon bringing said cover and base member together, said fingers being normally biased out of contact with said keeper flange and constructed for flexure into locking relationship with said keeper flange;

retaining means including a blocking collar and a finger guiding surface associated with said collar, said retaining means secured to one of said members being movable between a first position for blocking release of said fingers from said keeper, and a second normal position with the collar moved out of blocking relationship with said fingers, allowing said fingers to assume their normally biased position out of contact with said keeper, said guide surface being operable, as the retaining means is moved from its said second normal position to its said first position, to bear against said flexible fingers and guide them into locking relationship with said keeper;

resilient means for yieldably bringing said retaining means into said first position in response to bringing said cover member and base member together; and button actuating means for urging said retaining means to its second named position to release said cover member from said base member.

6. A container, as defined in claim 5, wherein said means for yieldably bringing said retaining means to its said first named position includes a spring.

7. A container, as defined in claim 6, wherein said means for yieldably bringing said retaining means to its said first named position further includes means for actuating said spring in response to bringing said cover and base member together.

8. A container as defined in claim 7, wherein said retaining means is secured to said means for urging said retaining means to its second named position and said latter means is axially movable.